(12) United States Patent
Asai (10) Patent No.: US 9,843,057 B2
(45) Date of Patent: Dec. 12, 2017

(54) FUEL CELL SYSTEM AND CONTROL METHOD OF FUEL CELL SYSTEM

(71) Applicant: NISSAN MOTOR CO., LTD., Yokohama-shi, Kanagawa (JP)

(72) Inventor: Yoshitomo Asai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 65 days.

(21) Appl. No.: 14/903,760

(22) PCT Filed: Jul. 3, 2014

(86) PCT No.: PCT/JP2014/067846
§ 371 (c)(1),
(2) Date: Jan. 8, 2016

(87) PCT Pub. No.: WO2015/005229
PCT Pub. Date: Jan. 15, 2015

(65) Prior Publication Data
US 2016/0156046 A1 Jun. 2, 2016

(30) Foreign Application Priority Data

Jul. 11, 2013 (JP) ................................. 2013-145670

(51) Int. Cl.
*H01M 8/04* (2016.01)
*H01M 8/04089* (2016.01)
(Continued)

(52) U.S. Cl.
CPC ... *H01M 8/04104* (2013.01); *H01M 8/04179* (2013.01); *H01M 8/04231* (2013.01);
(Continued)

(58) Field of Classification Search
CPC ......... H01M 8/04104; H01M 8/04119; H01M 8/04126; H01M 8/0428; H01M 8/04388;
(Continued)

(56) References Cited

U.S. PATENT DOCUMENTS

2012/0107711 A1* 5/2012 Tomita .............. H01M 8/04388
429/446
2013/0089801 A1 4/2013 Takeshita et al.
(Continued)

FOREIGN PATENT DOCUMENTS

EP 1 447 870 A1 8/2004
JP 2006-278046 A 10/2006
(Continued)

*Primary Examiner* — Karie Apicella
(74) *Attorney, Agent, or Firm* — Foley & Lardner LLP (57) ABSTRACT

A fuel cell system for generating power by supplying anode gas and cathode gas to a fuel cell, comprising a compressor for supplying the cathode gas to the fuel cell, a pulsating operation unit causing a pressure of the anode gas to pulsate based on an operation state of the fuel cell system, a first target pressure setting unit setting a first target pressure of the cathode gas based on a request of the fuel cell, a second target pressure setting unit setting a second target pressure of the cathode gas for keeping a differential pressure in the fuel cell to be within a permissible differential pressure range according to the pressure of the anode gas in the fuel cell, and a compressor control unit controlling the compressor based on the first target pressure and the second target pressure. The second target pressure setting unit sets the second target pressure based on an upper limit target pressure in pulsation on the pulsation of the pressure of the anode gas.

8 Claims, 8 Drawing Sheets

(51) Int. Cl.
    *H01M 8/0438*     (2016.01)
    *H01M 8/04746*     (2016.01)
    *H01M 8/04223*     (2016.01)
    *H01M 8/04119*     (2016.01)
    *H01M 8/04828*     (2016.01)
    *H01M 8/0432*     (2016.01)
    *H01M 8/04537*     (2016.01)

(52) U.S. Cl.
    CPC ... *H01M 8/04388* (2013.01); *H01M 8/04395* (2013.01); *H01M 8/04753* (2013.01); *H01M 8/0485* (2013.01); *H01M 8/04126* (2013.01); *H01M 8/04335* (2013.01); *H01M 8/04649* (2013.01)

(58) Field of Classification Search
    CPC ......... H01M 8/04395; H01M 8/04746; H01M 8/04753; H01M 8/0485; H01M 8/04828; H01M 8/04089
    See application file for complete search history.

(56) References Cited

U.S. PATENT DOCUMENTS

2014/0349208 A1     11/2014   Ikezoe et al.
2016/0149242 A1     5/2016   Asai

FOREIGN PATENT DOCUMENTS

| | | |
|---|---|---|
| JP | 2012-003957 A | 1/2012 |
| JP | 2012-252960 A | 12/2012 |
| JP | 2012-256514 A | 12/2012 |
| JP | 2013-114860 A | 6/2013 |
| WO | WO 2011/004780 A1 | 1/2011 |

\* cited by examiner

FUEL CELL SYSTEM AND CONTROL METHOD OF FUEL CELL SYSTEM

TECHNICAL FIELD

The present invention relates to a fuel cell system and a control method of the fuel cell system.

BACKGROUND ART

As a conventional fuel cell system, JP2012-003957A discloses a fuel cell system chat controls a compressor and a pressure regulating valve so as to control a flow rate and a pressure of cathode gas to achieve target values.

SUMMARY OF INVENTION

According to a study of a fuel cell system that is currently under development, each of the flow rate and the pressure of the cathode gas to be supplied to a fuel cell is respectively controlled to achieve the target values, without using the pressure regulating valve. Specifically, a supply flow rate of the compressor is controlled based on a target pressure of the cathode gas, so as to control the pressure to be the target pressure. It is studied that an excessive amount of a flow rate for the fuel cell, to which the compressor has supplied, is flowed to a bypass passage of the fuel cell in order to control the pressure to be the target pressure.

It is also studied that pulsating operation causing a pressure of anode gas to pulsate is performed in such a fuel cell system. When the pulsating operation is performed, a differential pressure of an electrolyte membrane between an anode electrode side and a cathode electrode side in the fuel cell (hereinafter referred to as the "intermembrane differential pressure") fluctuates in response to the pulsation of the pressure of the anode gas. When this intermembrane differential pressure becomes excessively high, unexpected stress may be applied to the electrolyte membrane, as a result of which the fuel cell may be deteriorated.

Therefore, when the target pressure of the cathode gas, set according to a request of the fuel cell, is lower than a lower limit pressure that is obtained by subtracting a permissible intermembrane differential pressure from the pressure of the anode gas and that is for protecting the membrane, it is desirable to control the compressor by using the lower limit pressure, for protecting the membrane, as the target pressure.

However, the lower limit pressure for protecting the membrane is calculated based on the pressure of the anode gas and therefore the lower limit pressure pulsates (increases/decreases), together with the pulsation of the pressure of the anode gas.

When the compressor is controlled by using the lower limit pressure that is for protecting the membrane and that is pulsating as described above, as the target pressure of the cathode gas, the supply flow rate of the compressor periodically increases/decreases together with the pulsation of the target pressure, which causes such at possibility that unusual sounds, such as a roar, are generated from the compressor.

The present invention is made in view of the above-described problems, and its object is to suppress the generation of the unusual sounds from the compressor, in the fuel cell system that controls the supply flow rate of the compressor based on the target pressure of the cathode gas.

According to one aspect of the present invention, a fuel cell system for generating power by supplying anode gas and cathode gas to a fuel cell is provided. The fuel cell system includes a compressor for supplying the cathode gas to the fuel cell, a pulsating operation unit causing a pressure of the anode gas to pulsate based on an operation state of the fuel cell system, a first target pressure setting unit setting a first target pressure of the cathode gas based on a request of the fuel cell, a second target pressure setting unit setting a second target pressure of the cathode gas for keeping a differential pressure in the fuel cell to be within a permissible differential pressure range according to the pressure of the anode gas in the fuel cell, and a compressor central unit controlling the compressor based on the first target pressure and the second target pressure. The second target pressure setting unit sets the second target pressure based on an upper limit target pressure in pulsation on the pulsation of the pressure of the anode gas.

DESCRIPTION OF EMBODIMENTS

Hereinafter, embodiments of the present invention will be explained with reference to the drawings.

First Embodiment

A fuel cell, in which an electrolyte membrane is sandwiched between an anode electrode (fuel electrode) and a cathode electrode (oxidant electrode), supplies anode gas (fuel gas) containing hydrogen to the anode electrode and cathode gas (oxidant gas) containing oxygen to the cathode electrode, so as to generate power. Electrode reactions that take place in both of the anode electrode and the cathode electrode are as follows.

Anode electrode: $2H_2 \rightarrow 4H^+ + 4e^-$ (1)

Cathode electrode: $4H^+ + 4e^- + O_2 \rightarrow 2H_2O$ (2)

By the electrode reactions of (1) and (2), the fuel cell generates an electromotive force of about one volt.

When the fuel cell is used as an automobile power source, hundreds of pieces of the fuel cells are laminated and used as a fuel cell stack, as a large amount of power is required. Then, a fuel cell system for supplying the anode gas and the cathode gas to the fuel cell stack is formed, and power for driving a vehicle is extracted therefrom.

Figure 1:
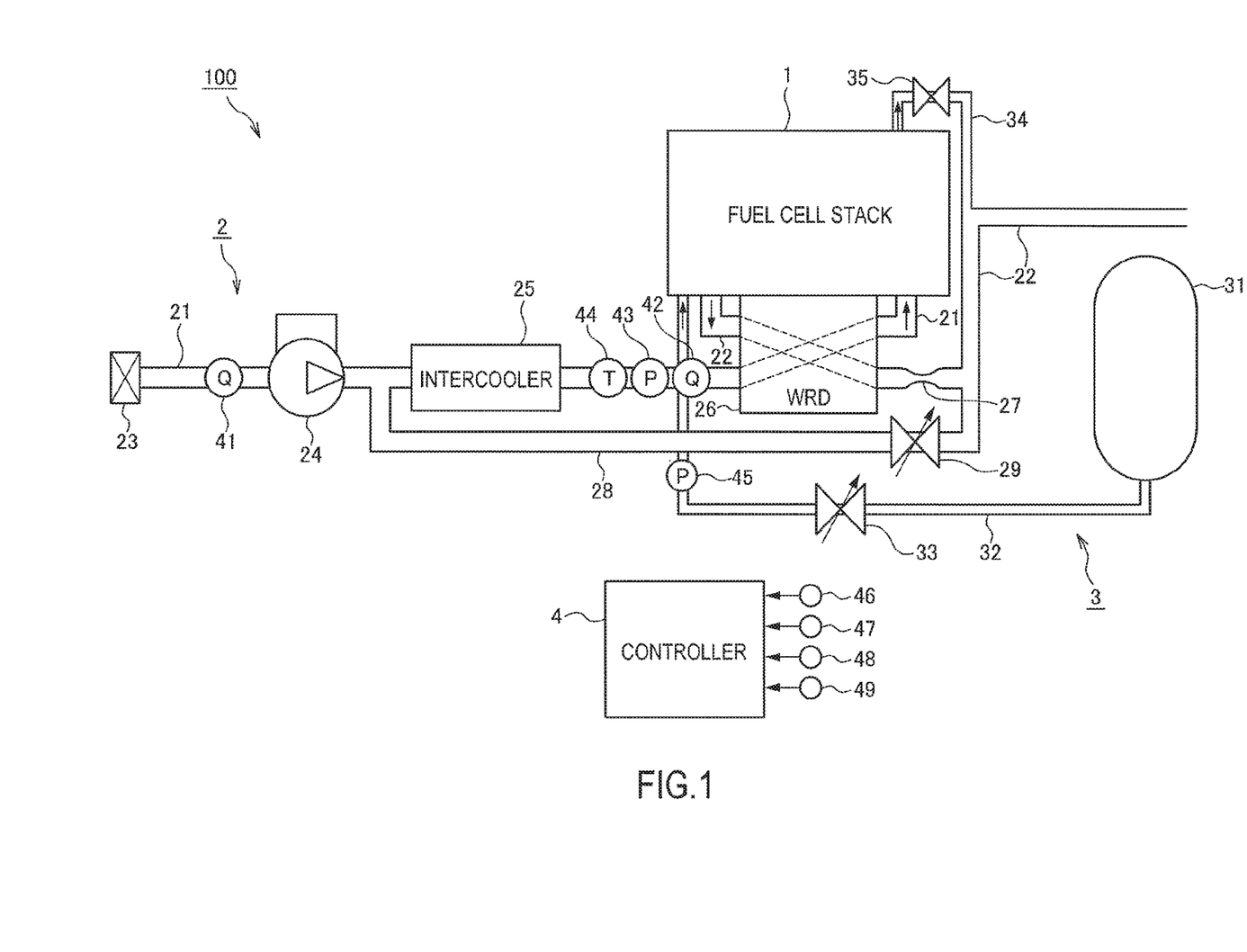
FIG. 1 is a schematic view of a fuel cell system according to a first embodiment of the present invention.

FIG. 1 is a schematic view of a fuel cell system 100 according to a first embodiment of the present invention.

The fuel cell system 100 is provided with a fuel cell stack 1, a cathode gas supply and discharge device 2, an anode gas supply and discharge device 3, and a controller 4.

The fuel cell stack 1, formed by laminating the hundreds of pieces of the fuel cells, generates power required for driving the vehicle by receiving the supply of the anode gas and the cathode gas.

The cathode gas supply and discharge device 2 supplies the cathode gas (air) to the fuel cell stack 1, and discharges cathode off-gas that is discharged from the fuel cell stack 1 to the open air. The cathode gas supply and discharge device 2 is provided with a cathode gas supply passage 21, a cathode gas discharge passage 22, a filter 23, a cathode compressor 24, an intercooler 25, a water recovery device (hereinafter referred to as the "WRD") 26, an orifice 27, a bypass passage 28, a bypass valve 29, a first air flow sensor 41, a second air flow sensor 42, a cathode pressure sensor 43, and a temperature sensor 44.

The cathode gas supply passage 21 is a passage through which the cathode gas supplied to the fuel cell stack 1 flows. One end of the cathode gas supply passage 21 is connected to the filter 23, and the other end is connected to a cathode gas inlet hole of the fuel cell stack 1.

The cathode gas discharge passage 22 is a passage, through which the cathode off-gas, discharged from the fuel cell stack 1, flows. One end of the cathode gas discharge passage 22 is connected to a cathode gas outlet hole of the fuel cell stack 1, and the other end forms an open end. The cathode off-gas is mixed gas of oxygen that is not used in the electrode reaction, nitrogen that is contained in the cathode gas, water vapor that is generated in the electrode reaction, and the like.

The filter 23 removes foreign matters in the cathode gas that is taken into the cathode gas supply passage 21.

The cathode compressor 24 is provided on the cathode gas supply passage 21. The cathode compressor 24 takes air; as the cathode gas, into the cathode gas supply passage 21 via the filter 23, and supplies it to the fuel cell stack 1.

The intercooler 25 is provided on the cathode gas supply passage 21 at the position downstream of the cathode compressor 24. The intercooler 25 cools the cathode gas that is delivered from the cathode compressor 24.

The WRD 26, connected to the cathode gas supply passage 21 and the cathode gas discharge passage 22, respectively, collects moisture in the cathode off-gas flowing through the cathode gas discharge passage 22. The WRD 26 also uses the collected moisture to humidify the cathode gas flowing through the cathode gas supply passage 21.

The orifice 27 is provided on the cathode gas discharge passage 22 at the position downstream of the WRD 26. The orifice 27 limits a flow rate of the cathode off-gas flowing through the cathode gas discharge passage 22.

The bypass passage 28 is a passage provided to cause a part of the cathode gas delivered from the cathode compressor 24 to be discharged directly to the cathode gas discharge passage 22 without passing through the fuel cell stack 1, when necessary. One end of the bypass passage 28 is connected to the cathode gas supply passage 21 at the position between the cathode compressor 24 and the intercooler 25, and the other end is connected to the cathode gas discharge passage 22 at the position downstream of the orifice 27.

The bypass valve 29 is provided on the bypass passage 28. The bypass valve 29 is controlled to open/close by the controller 4, so as to regulate the flow rate of the cathode gas flowing through the bypass passage 28 (hereinafter referred to as the "bypass flow rate").

The first air flow sensor 41 is provided on the cathode gas supply passage 21 at the position upstream of the cathode compressor 24. The first air flow sensor 41 detects the flow rate of the cathode gas that is supplied to the cathode compressor 24 (hereinafter referred to as the "compressor supply flow rate").

The second air flow sensor 42 is provided on the cathode gas supply passage 21 at the position downstream of the connection between the cathode gas supply passage 21 and the bypass passage 28. The second air flow sensor 42 detects the flow rate of the cathode gas delivered from the cathode compressor 24 (hereinafter referred to as the "stack supply flow rate"). The cathode gas delivered from the cathode compressor 24 is a part of the cathode gas supplied to the fuel cell stack 1. The stack supply flow rate is a flow rate obtained by subtracting the bypass flow rate from the compressor supply flow rate.

The cathode pressure sensor 43 is provided on the cathode gas supply passage 21 at the position near the WRD 26 on the side of the cathode gas inlet. The cathode pressure sensor 43 detects a pressure of the cathode gas near the WRD 26 on the side of the cathode gas inlet (hereinafter referred to as the "cathode pressure").

The temperature sensor 44 is provided on the cathode gas supply passage 21 at the position between the intercooler 25 and the WRD 26. The temperature sensor 44 detects the temperature of the WRD 26 on the side of the cathode gas inlet (hereinafter referred to as the "WRD inlet temperature").

The anode gas supply and discharge device 3 supplies the anode gas to the fuel cell stack 1, and discharges anode off-gas that is discharged from the fuel cell stack 1 to the cathode gas discharge passage 22. The anode gas supply and discharge device 3 is provided with a high pressure tank 31, an anode gas supply passage 32, an anode pressure regulating valve 33, an anode gas discharge passage 34, a purge valve 35, and an anode pressure sensor 45.

The high pressure tank 31 keeps the anode gas (hydrogen), to be supplied to the fuel cell stack 1, in a high pressure state, and stores the anode gas.

The anode gas supply passage 32 is a passages for supplying the anode gas, discharged from the high pressure tank 31, to the feel cell stack 1. One end of the anode gas supply passage 32 is connected to the high pressure tank 31, and the other end is connected to an anode gas inlet hole of the fuel cell stack 1.

The anode pressure regulating valve 33 is provided on the anode gas supply passage 32. The anode pressure regulating valve 33 is controlled to open/close by the controller 4, so as to regulate the pressure of the anode gas, supplied to the fuel cell stack 1, to be the desired pressure.

The anode gas discharge passage 34 is a passage, through which the anode off-gas discharged from the fuel cell stack 1 flows. One end of the anode gas discharge passage 34 is connected to an anode gas outlet hole of the fuel cell stack 1, and the other end is connected to the cathode gas discharge passage 22.

The anode off-gas which has been discharged to the cathode gas discharge passage 22 via the anode gas discharge passage 34 is mixed with the cathode off-gas in the cathode gas discharge passage 22, and discharged to the outside of the fuel cell system 100. As the anode off-gas contains the excess anode gas that is not used in the electrode reaction, the anode off-gas is mixed with the cathode off-gas and discharged to the outside of the fuel cell system 100, so that hydrogen concentration in the discharged gas becomes the preset concentration that is determined in advance or less.

The purge valve 35 is provided on the anode gas discharge passage 34. The purge valve 35 is controlled to open/close by the controller 4 so as to regulate a flow rate of the anode off-gas discharged from the anode gas discharge passage 34 to the cathode gas discharge passage 22.

The anode pressure sensor 45 is provided on the anode gas supply passage 32 at the position downstream of the anode pressure regulating valve 33, and detects the pressure of the anode gas supplied to the fuel cell stack 1 (hereinafter referred to as the "anode pressure").

The controller 4 is formed by a microcomputer provided with a central processing unit (CPU), read-only memory (ROM), random access memory (RAM), and an input/output interface (I/O interface).

Signals from various sensors, such as a current sensor 46 that detects a current (output current) extracted from the fuel cell stack 1, a voltage sensor 47 that detects an output voltage of the fuel cell stack 1, an accelerator stroke sensor 48 that detects a depressing amount of an accelerator pedal (hereinafter referred to as an "accelerator operation amount"), and an SOC sensor 49 that detects a battery charge amount, as well as the above-described first air flow sensor 41 and the like, are inputted to the controller 4. On the basis of the signals from the various sensors, the controller 4 detects an operation state of the fuel cell system 100.

Then, the controller 4 controls the supply of the anode gas to the fuel cell stack 1 in such a manner that the anode pressure pulsates, and controls the supply of the cathode gas in such a manner that the cathode pressure agrees with a target. Hereinafter, the anode gas supply control and the cathode gas supply control carried out by the controller 4 will be explained.

Figure 2:
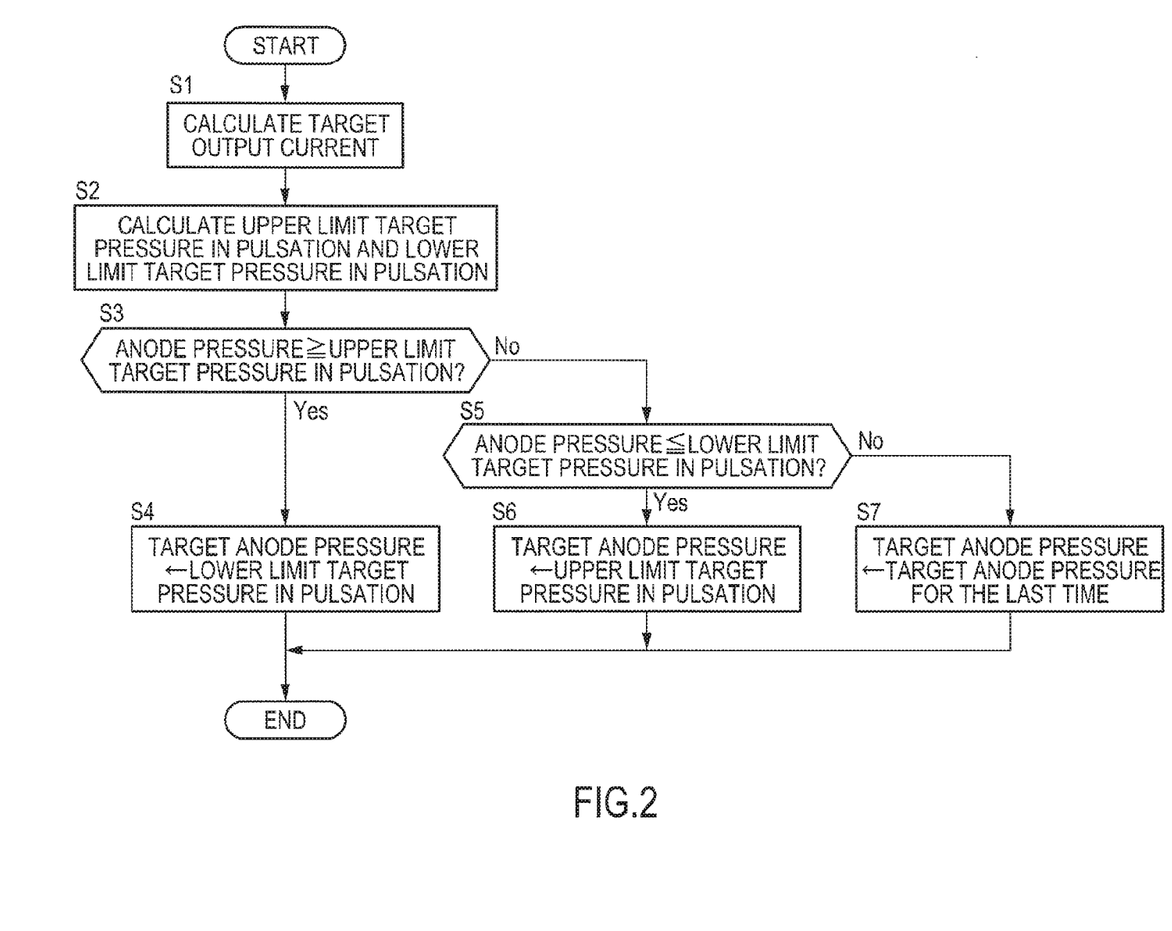
FIG. 2 is a flowchart explaining anode gas supply control according to the first embodiment of the present invention.

FIG. 2 is a flowchart explaining the anode gas supply control according to this embodiment.

In a step S1, the controller 4 calculates a target output current of the fuel cell stack 1, based on the operation state of the fuel cell system 100. Specifically, it calculates target output power of the fuel cell stack 1 based on request power of auxiliary machines, such as a drive motor (not illustrated) that generates a driving force of the vehicle, and the cathode compressor 24, and a charge and discharge request of the battery and, based on the target output power, calculates the target output current from IV characteristics of the fuel cell stack 1.

Figure 3:
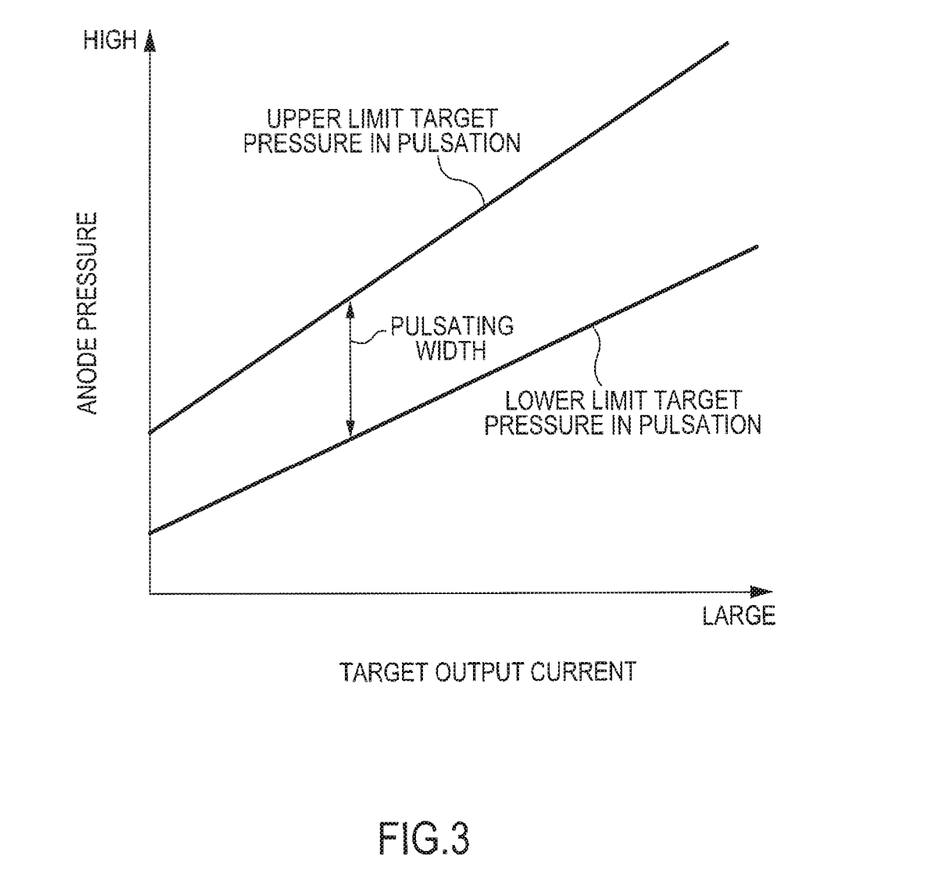
FIG. 3 is a table for calculating an upper limit target pressure in pulsation and a lower limit target pressure in pulsation based on a target output current.

In a step S2, the controller 4 refers to a table of FIG. 3, and calculates an upper limit target pressure in pulsation and a lower limit target pressure in pulsation, based on the target output current. As illustrated in the table of FIG. 3, the upper limit target pressure in pulsation and the lower limit target pressure in pulsation become higher as the target output current is larger, as compared with the case when the target output current is smaller. Similarly, pulsating width also becomes greater when the target output current is larger, as compared with the case when the target output current is smaller.

In a step S3, the controller 4 decides whether or not the anode pressure is higher than the upper limit target pressure in pulsation. When the anode pressure is the upper limit target pressure in pulsation or higher, the controller 4 executes processing of a step S4 so as to lower the anode pressure. Meanwhile, when the anode pressure is lower than the upper limit target pressure in pulsation, the controller 4 executes processing of a step S5.

In the step S4, the controller 4 sets a target anode pressure to be the lower limit target pressure in pulsation. Thereby, an opening degree of the anode pressure regulating valve 33 is subjected to feedback control so that the anode pressure becomes the lower limit target pressure in pulsation. As a result of this feedback control, the anode pressure regulating valve 33 is fully closed in most cases, and the supply of the anode gas from the high pressure tank 31 to the fuel cell stack 1 is stopped. Consequently, the anode pressure is reduced as the anode gas in the fuel cell stack 1 is consumed by power generation.

In the step S5, the controller 4 decides whether or not the anode pressure is the lower limit target pressure in pulsation or lower. When the anode pressure is the lower limit target pressure in pulsation or lower, the controller 4 executes processing of a step S6 so as to raise the anode pressure. Meanwhile, when the anode pressure is higher than the lower limit target pressure in pulsation, processing of a step S7 is executed.

In the step S6, the controller 4 sets the target anode pressure to be the upper limit target pressure in pulsation. Thereby, the opening degree of the anode pressure regulating valve 33 is subjected to the feedback control so that the anode pressure becomes the upper limit target pressure in pulsation. As a result of this feedback control, the anode pressure regulating valve 33 is opened to the desired opening degree, and the anode pressure increases as the anode gas is supplied from the high pressure tank 31 to the fuel cell stack 1.

In the step S7, the controller 4 sets the target anode pressure to be the target anode pressure that is the same as the one for the last time.

When such pulsating operation is made, an intermembrane differential pressure of the electrolyte membrane between the anode electrode side and the cathode electrode of each fuel cell fluctuates as the anode pressure pulsates. When this intermembrane differential pressure becomes excessively high, unexpected stress may be applied to the electrolyte membrane and mechanical strength of the electrolyte membrane may be decreased, as a result of which the fuel cell may be deteriorated.

One of possible methods of suppressing the deterioration of the fuel cell like this is that, when a target cathode pressure, set based on the operation state of the fuel, cell system 100, becomes lower than a lower limit pressure that is obtained by subtracting a predetermined permissible intermembrane differential pressure from the anode pressure and that is for protecting the membrane, the lower limit pressure is set as the target cathode pressure.

However, according to this method, the lower limit pressure for protecting the membrane is calculated based on the pulsating anode pressure, and therefore the lower limit pressure also pulsates.

Thus, when the lower limit pressure is set to be the target cathode pressure, the target cathode pressure pulsates. As a result of this, rotation speed of the cathode compressor 24, controlled according to the target cathode pressure, periodically increases/decreases together with the pulsation of the target cathode pressure, which causes such a possibility that unusual sounds, such as a roar, are generated from the cathode compressor 24.

For this reason, when the target cathode pressure pulsates together with the pulsation of the anode pressure like this, a pressure limiting the pulsation of the target cathode pressure is set as a limit target cathode pressure, and the cathode compressor 24 is controlled according to this limit target cathode pressure, according to this embodiment. Specifically, an intermembrane differential pressure limiting request target pressure, obtained by subtracting the permissible intermembrane differential pressure from the upper limit target pressure in pulsation, is set as the limit target cathode pressure.

When the target output current does not fluctuate, the upper limit target pressure in pulsation is fixed at a predetermined value corresponding to the target output current, and thus the intermembrane differential pressure limiting request target pressure, obtained by subtracting the permissible intermembrane differential pressure from the upper limit target pressure in pulsation, is also fixed to a certain predetermined value. Therefore, when the target cathode pressure pulsates together with the pulsation of the anode pressure, the cathode compressor 24 as controlled according to the intermembrane differential pressure limiting request target pressure that is kept at the predetermined value, so as to suppress the pulsation of the rotation speed of the cathode compressor 24. Hereinafter, the cathode gas supply control according to this embodiment will be explained.

Figure 4:
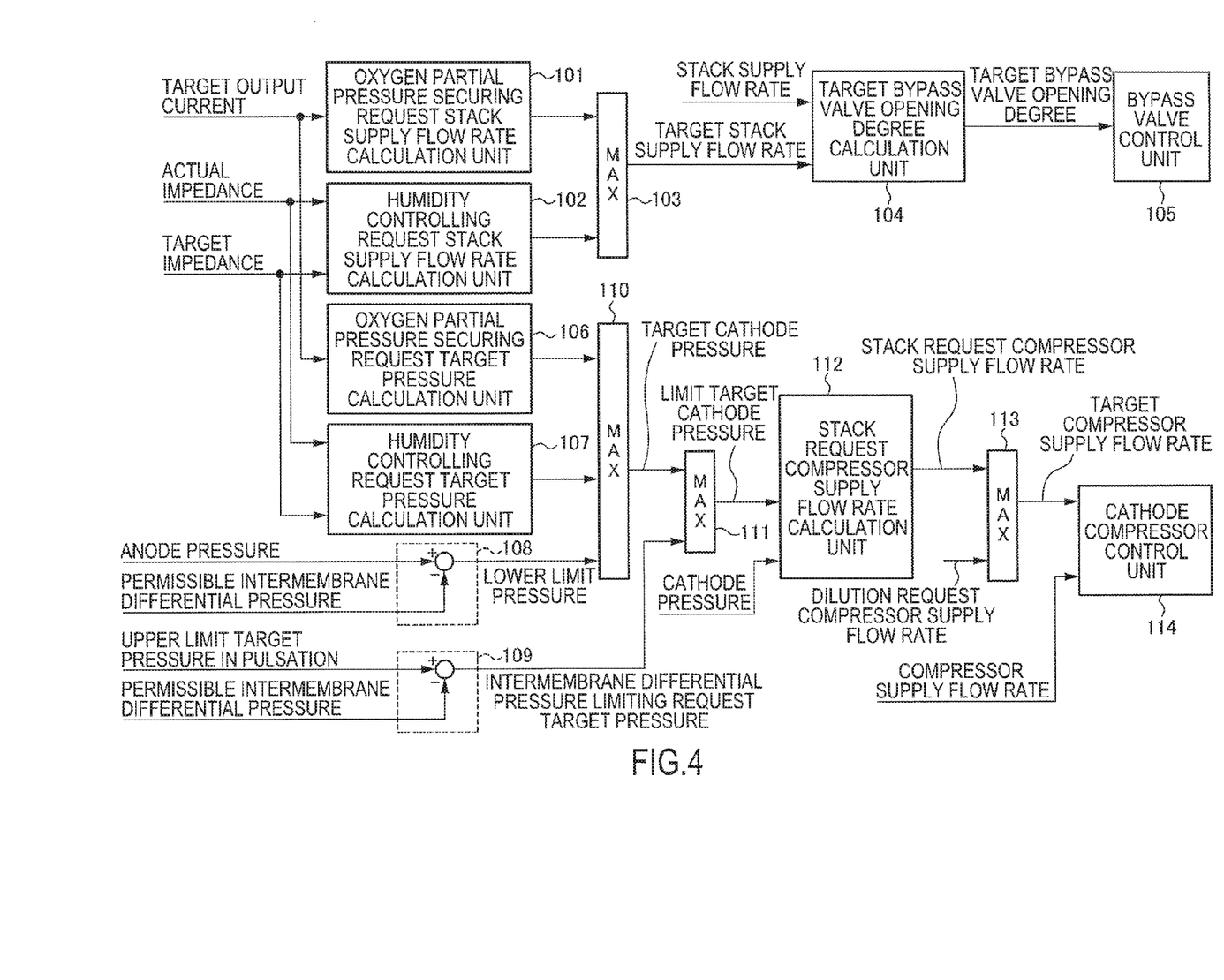
FIG. 4 is a block diagram explaining cathode gas supply control according to the first embodiment of the present invention.

FIG. 4 is a block diagram explaining the cathode gas supply control according to this embodiment.

The target output current is inputted to an oxygen partial pressure securing request stack supply flow rate calculation unit 101. The oxygen partial pressure securing request stack supply flow rate calculation unit 101 calculates an oxygen partial pressure securing request stack supply flow rate, based on the target output current. This oxygen partial pressure securing request stack supply flow rate is a target value of the stack supply flow rate that is required for securing an oxygen partial pressure required for the electrode reaction in the cathode electrode in each fuel cell, when the target output current is extracted from the fuel cell stack 1. The oxygen partial pressure securing request stack supply flow rate becomes higher when the target output current is larger, as compared with the case when the target output current is smaller.

An impedance of the fuel cell stack 1 that is calculated by an AC impedance method, for example, and a target impedance that is determined in advance according to the target output current of the fuel cell stack 1 are inputted to a humidity controlling request stack supply flow rate calculation unit 102. Based on a deviation between the impedance and the target impedance, the humidity controlling request stack supply flow rate calculation unit 102 calculates, as a humidity controlling request stack supply flow rate, a target value of the stack supply flow rate causing the impedance to be the target impedance. This humidity controlling request stack supply flow rate may be reworded as a stack supply flow rate that is required for controlling the humidity (water content) of the electrolyte membrane to be the optimum humidity according to the target output current of the fuel cell stack 1.

The oxygen partial pressure securing request stack supply flow rate and the humidity controlling request stack supply flow rate are inputted to a target stack supply flow rate calculation unit 103. The target stack supply flow rate calculation unit 103 calculates the higher rate, out of the above-described two rates, as a target stack supply flow rate.

The stack supply flow rate and the target stack supply flow rate are inputted to a target bypass valve opening degree calculation unit 104. On the basis of a deviation between the stack supply flow rate and the target stack supply flow rate, the target bypass valve opening degree calculation unit 104 calculates an opening degree of the bypass valve 29, causing the stack supply flow rate to be the target stack supply flow rate, as a target bypass valve opening degree.

The target bypass valve opening degree is inputted to a bypass valve control unit 105. The bypass valve control unit 105 controls the opening degree of the bypass valve 29 to be the target bypass valve opening degree. Incidentally, an actual opening degree of the bypass valve 29 may be inputted to the bypass valve control unit 105 and, based on the actual opening degree and the target bypass valve opening degree, the opening degree of the bypass valve 29 may be controlled.

The target output current is inputted to an oxygen partial pressure securing request target pressure calculation unit 106. The oxygen partial pressure securing request target pressure calculation unit 106 calculates an oxygen partial pressure securing request target pressure, based on the target output current. This oxygen partial pressure securing request target pressure is a target value of the cathode pressure that is required for securing the oxygen partial pressure required for the electrode reaction in the cathode electrode in each fuel cell, when the target output current is extracted from the fuel cell stack 1. The oxygen partial pressure securing request target pressure becomes higher when the target output current is larger, as compared with the case when the target output current is smaller.

The impedance of the fuel cell stack 1 and the target impedance are inputted to a humidity controlling request target pressure calculation unit 107. On the basis of the deviation between the impedance and the target impedance, the humidity controlling request target pressure calculation unit 107 calculates, as a humidity controlling request target pressure, a target value of the cathode pressure causing the impedance to be the target impedance. This humidity controlling request target pressure is a cathode pressure that is required for controlling the humidity (water content) of the electrolyte membrane to be the optimum humidity according to the target output current of the fuel cell stack 1.

The anode pressure and the permissible intermembrane differential pressure are inputted to a lower limit pressure calculation unit 108. The lower limit pressure calculation unit 108 calculates, as the lower limit pressure of the cathode gas (membrane protecting request target pressure), a value obtained by subtracting a permissible intermembrane differential pressure from the anode pressure. The lower limit pressure is a lower limit value of the cathode pressure that needs to be maintained in order to protect the electrolyte membrane and, when the anode pressure pulsates, the lower limit pressure also pulsates together with the pulsation of the anode pressure. Incidentally, the permissible intermembrane differential pressure is a predetermined value that is set as appropriate by regarding a permissible maximum value of the intermembrane differential pressure (hereinafter referred to as the "maximum permissible intermembrane differential pressure") as an upper limit.

The upper limit target pressure in pulsation and the permissible intermembrane differential pressure are inputted to an intermembrane differential pressure limiting request target pressure calculation unit 109. The intermembrane differential pressure limiting request target pressure calculation unit 109 calculates, as an intermembrane differential pressure limiting request target pressure, a value obtained by subtracting the permissible intermembrane differential pressure from the upper limit target pressure in pulsation.

The oxygen partial pressure securing request target pressure, the humidity controlling request target pressure, and the lower limit pressure (membrane protecting request target pressure) are inputted to a target cathode pressure calculation unit 110. The target cathode pressure calculation unit 110 calculates, as the target cathode pressure, the highest value, out of the three inputted values. Thus, the target cathode pressure calculation unit 110 according to this embodiment sets the optimum one based on the requests of the fuel cell stack 1, such as the oxygen partial pressure securing request, the humidity controlling request, and the membrane protecting request.

The target cathode pressure and the intermembrane differential pressure limiting request target pressure are inputted to a limit target cathode pressure calculation unit 111. The limit target cathode pressure unit 111 calculates, as a limit target cathode pressure, the higher value, out of the two inputted value.

The cathode pressure and the limit target cathode pressure are inputted to a stack request compressor supply flow rate calculation unit 112. On the basis of a deviation between the cathode pressure and the limit target cathode pressure, the stack request compressor supply flow rate calculation unit 112 calculates, as a stack request compressor supply flow rate, a target value of the compressor supply flow rate causing the cathode pressure to be the limit target cathode pressure. The stack request compressor supply flow rate may be reworded as a compressor supply flow rate that is required for satisfying the requests of the fuel cell stack 1, such as the oxygen partial pressure securing request and the humidity controlling request.

The stack request compressor supply flow rate and a dilution request compressor supply flow rate that is determined according to the target output current of the fuel cell stack 1 are inputted to a target compressor supply flow rate calculation unit 113. The target compressor supply flow rate unit 113 calculates, as a target compressor supply flow rate, the higher value, out of the two inputted value. Incidentally, the dilution request compressor supply flow rate is a compressor supply flow rate that is required for causing the hydrogen concentration in the discharge gas, discharged to the outside of the fuel cell system 100, to be the predetermined concentration or less. According to this embodiment, the dilution request compressor supply flow rate is made higher when the target output current is larger, as compared with the case when the target output current is smaller, but it may be a fixed value irrespective of the target output current.

The compressor supply flow rate and the target compressor supply flow rate are inputted to a cathode compressor control unit 114. On the basis of a deviation between the compressor supply flow rate and the target compressor supply flow rate, the cathode compressor control unit 114 calculates a torque command value to the cathode compressor 24, and controls the cathode compressor 24 based on the torque command value.

Thus, according to this embodiment, the target compressor supply flow rate (stack request compressor supply flow rate) is calculated based on the limit target cathode pressure, and the cathode compressor 24 is controlled in such a manner that the compressor supply flow rate becomes the target compressor supply flow rate, as a result of which the cathode pressure is controlled to be the limit target cathode pressure. Therefore, according to this embodiment, the cathode compressor 24 is finally controlled based on the target cathode pressure and the intermembrane differential pressure limiting request target pressure.

When the stack supply flow rate becomes higher than the target stack supply flow rate, as a result of controlling the cathode compressor 24 in such a manner that the compressor supply flow rate becomes the target compressor supply flow rate, the bypass valve 29 is controlled in such a manner that the stack supply flow rate becomes the target stack supply flow rate. Namely, when the flow rate of the cathode gas, supplied by the compressor 24 to the fuel cell stack 1, is higher than the required flow rate, the cathode gas, by the amount not required for the fuel cell stack 1, is flowed to the bypass passage 28 by opening the bypass valve 29.

Figure 5:
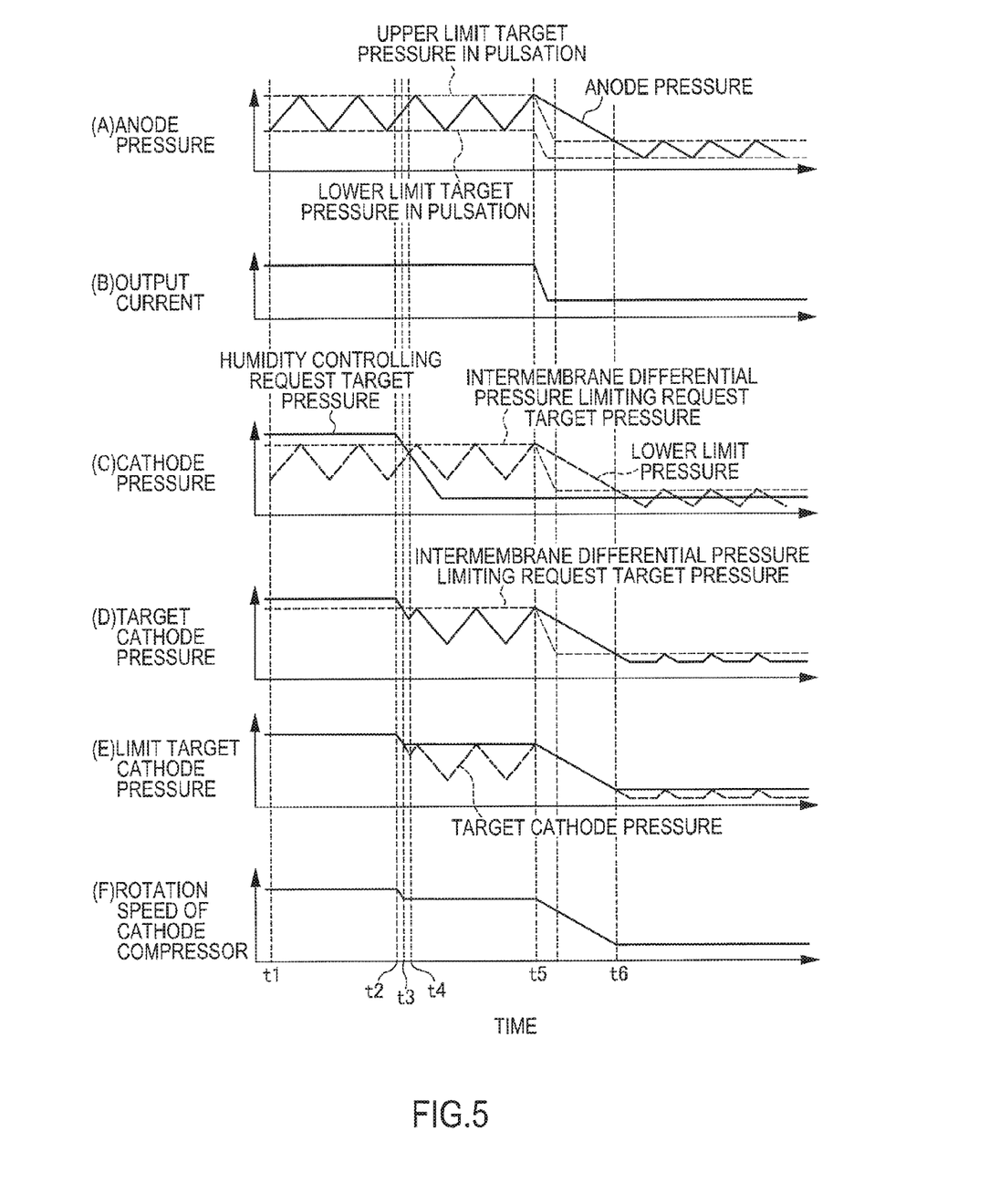
FIG. 5 is a time chart explaining operation of the anode gas supply control and the cathode gas supply control according to the first embodiment of the present invention.

FIG. 5 is a time chart explaining operation of the anode gas supply control and the cathode gas supply control according to this embodiment.

First, the operation of the anode gas supply control will be explained.

With this time chart, the pulsating operation that causes the anode pressure to pulsate between the upper limit target pressure in pulsation and the lower limit target pressure in pulsation, calculated based on the target output current, is already made at time t1 (FIG. 5(A)). As the target output current is constant during a period from, the time t1 to time t5 (FIG. 5(B)), the pulsating operation that is made at the time t1 and that causes the anode pressure to pulsate between the upper limit target pressure in pulsation and the lower limit target pressure in pulsation is continued (FIG. 5(A)).

When the target output current decreases at the time t5 by, for example, the reduction of the accelerator operation amount (FIG. 5(B)), the upper limit target pressure in pulsation and the lower limit target pressure in pulsation also decrease in response to the decrease of the target output current (FIG. 5(A)).

In order to control the anode pressure to be the reduced lower limit target pressure in pulsation, the opening degree of the anode pressure regulating valve 33 is fully closed, and the supply of the anode gas from the high pressure tank 31 to the fuel cell stack 1 is stopped. As a result of this, the anode gas in the fuel cell stack 1 is consumed gradually by the power generation, and the anode pressure decreases (FIG. 5(A)). Thus, reduction speed of the anode pressure, during a falling transient period when the target output current decreases, depends on consumption speed of the anode gas by the power consumption, and therefore, the anode pressure may be higher than the upper limit target pressure in pulsation temporarily during the falling transient period (FIG. 5(A)).

Next, the operation of the cathode gas supply control will be explained. Incidental, with this time chart, it is supposed that the humidity controlling request target pressure is higher than the oxygen partial pressure securing request pressure, and that the stack request compressor supply flow rate is higher than the dilution request compressor supply flow rate.

As the humidity controlling request target pressure is higher than the lower limit pressure at the time t1 (FIG. 5(C)), the humidity controlling request target pressure is set as the target cathode pressure (FIG. 5(D)). When this humidity controlling request target pressure as the target cathode pressure is compared with the intermembrane differential pressure limiting request, target pressure, the humidity controlling request target pressure is higher, and therefore, the humidity controlling request target pressure is set as the limit target cathode pressure (FIG. 5(E)).

Then, the stack request compressor supply flow rate is calculated according to the limit target cathode pressure. With this time chart, it is supposed that the stack request compressor supply flow rate is higher than the dilution request compressor supply flow rate. Therefore, the stack request compressor supply flow rate, calculated according to the limit target cathode pressure, is set as the target compressor supply flow rate and, based on the target compressor supply flow rate, the cathode compressor 24 is controlled.

As a result of this, the humidity controlling request target pressure that is kept at the constant value is set as the limit target cathode pressure during a period from the time t1 to time t2, and thus the rotation speed of the cathode compressor 24 also becomes constant (FIG. 5(F)).

When the humidity of the electrolyte membrane changes due to an influence of generated water by the power generation, for example, and the humidity controlling request target pressure decreases at the time t2 (FIG. 5(C)), the target cathode pressure and the limit target cathode pressure also decrease simultaneously (FIG. 5(D), (E)).

When the target cathode pressure (humidity controlling request target pressure) decreases to be lower than the intermembrane differential pressure limiting request target pressure at time t3 (FIG. 5(D)), the intermembrane differential pressure limiting request target pressure is set as the limit target cathode pressure (FIG. 5(E)).

When the lower limit pressure becomes higher than the humidity controlling request target pressure at time t4, the lower limit pressure is set as the target cathode pressure, and the target cathode pressure pulsates together with the pulsation of the anode pressure (FIG. 5(C), (D)). When the cathode compressor 24 is controlled according to the target cathode pressure that is pulsating like this, the rotation speed of the cathode compressor 24 periodically increases/decreases in response to the pulsation of the target cathode pressure, thus causing such a possibility that the unusual sounds, such as the roar, are generated from the cathode compressor 24.

Therefore, according to this embodiment, the higher pressure, out of the target cathode pressure and the intermembrane differential pressure limiting request target pressure, is set as the limit target cathode pressure, and the cathode compressor 24 is controlled according to this limit target cathode pressure.

For this reason, at and after the time t3, the cathode compressor 24 is controlled according to the limit target cathode pressure (intermembrane differential pressure limiting request target pressure) that is kept at the constant value, ever when the target cathode pressure pulsates at and after time t4. Therefore, the rotation speed of the cathode compressor 24 is kept constantly at and after the time t3 and the rotation speed of the cathode compressor 24 does not increase/decrease periodically, which makes it possible to suppress the generation of the unusual sounds, such as the roar, from the cathode compressor 24 (FIG. 5(F)).

When the anode pressure becomes higher than the upper limit target pressure in pulsation as the target output current of the fuel cell stack 1 decreases at the time t5 (FIG. 5(A)), the intermembrane differential pressure limiting request target pressure becomes lower than the lower limit pressure that is set as the target cathode pressure (FIG. 5(C)/(D)). As a result of this, the lower limit pressure is set as the limit target cathode pressure (FIG. 5(E)).

Thus, during the falling transient period when the target output current decreases, the anode pressure may temporarily become higher than the upper limit target pressure in pulsation, and the intermembrane differential pressure limiting request target pressure may become lower than the lower limit pressure. In this case, when the cathode compressor 24 is controlled by using the intermembrane differential pressure limiting request target pressure, lower than the lower limit pressure, as the limit target cathode pressure, there is a possibility that the intermembrane differential pressure exceeds the permissible intermembrane differential pressure.

Therefore, according to this embodiment, the higher pressure, out of the intermembrane differential pressure limiting request target pressure and the target cathode pressure, is set as the limit target cathode pressure, in consideration of the case where the intermembrane differential pressure limiting request target pressure becomes lower than the lower limit pressure during the falling transient period.

Thereby, the lower limit pressure is set as the limit target cathode pressure when the lower limit pressure becomes higher than the intermembrane differential pressure limiting request target pressure, which makes it possible to prevent the intermembrane differential pressure from exceeding the permissible intermembrane differential pressure.

When the anode pressure decreases to the upper limit target pressure in pulsation at time t6 (FIG. 5(A)), the intermembrane differential pressure limiting request target pressure is set as the limit target cathode pressure again. Thereby, at and after the time t6 the cathode compressor 24 is controlled according to the limit target cathode pressure (intermembrane differential pressure limiting request target pressure) that is kept at the constant value, which makes it possible to suppress the generation of the unusual sounds, such as the roar, from the cathode compressor 24 (FIG. 5(F)).

According to the embodiment as described thus far, the fuel cell system 100 is provided with the cathode compressor 24 for supplying the cathode gas to the fuel cell stack 1, a pulsating operation unit, a first target pressure setting unit, a second target pressure setting unit, and the controller 4 as a compressor control unit. The pulsating operation unit causes the pressure of the anode gas to pulsate based on the operation state of the fuel cell system 100. The first target pressure setting unit sets a first target pressure of the cathode gas (target cathode pressure) based on the requests of the fuel cell stack 1, such as the oxygen partial pressure securing request, the humidity controlling request, and the membrane protecting request. The second target pressure setting unit sets a second target pressure of the cathode gas (intermembrane differential pressure limiting request target pressure) for keeping the differential pressure inside the fuel cell stack 1 to be within a permissible differential pressure range according to the pressure of the anode gas in the fuel cell stack 1, based on the upper limit target pressure in pulsation that causes the pressure of the anode gas to pulsate. The compressor control unit controls the cathode compressor 24 based on the first target pressure and the second target pressure.

As the upper limit target pressure in pulsation is fixed at the predetermined value according to the target output current, when the target output current does not fluctuate, the intermembrane differential pressure limiting request target pressure, obtained by subtracting the permissible intermembrane differential pressure from the upper limit target pressure in pulsation, is also fixed at the certain predetermined value.

Therefore, even when the target cathode pressure pulsates together with the pulsation of the anode pressure, it is possible to prevent the rotation speed of the cathode compressor 24 from increasing/decreasing periodically, together with the pulsation of the target cathode pressure, by controlling the cathode compressor 24 according to the intermembrane differential pressure limiting request target pressure. This makes it possible to suppress the generation of the unusual sounds, such as the roar, from the cathode compressor 24.

Except for the falling transient period when the target output current decreases, the anode pressure is controlled to be equal to or lower than the upper limit target pressure in pulsation. Therefore, when the lower limit of the cathode pressure is limited based on the upper limit target pressure in pulsation, as in this embodiment, it is possible to prevent the intermembrane differential pressure from exceeding the permissible intermembrane differential pressure, during the pulsating operation. This makes it possible to suppress the reduction in the mechanical strength of the electrolyte membrane, and to suppress the deterioration of the fuel cell.

Further, according to this embodiment, the higher pressure, out of the target cathode pressure (first target pressure) and the intermembrane differential pressure limiting request target pressure (second target pressure), is set as the limit target cathode pressure, in consideration of the case where the lower limit pressure becomes temporarily higher than the intermembrane differential pressure limiting request target pressure during the falling transient period, so as to control the cathode compressor 24.

Thereby, the lower limit pressure is set as the limit target cathode pressure when the target output current decreases in the case where the lower limit pressure is set as the target cathode pressure, which makes it possible to prevent the intermembrane differential pressure from exceeding the permissible intermembrane differential pressure.

Second Embodiment

Next, a second embodiment of the present invention will be explained. This embodiment is different from the first embodiment in the details of the cathode gas supply control. This difference will be mainly explained in the following explanation. Incidentally, the same reference numerals and symbols are used in the following embodiment to designate the parts functioning similarly to those in the above-described first embodiment, and repeated explanations are omitted as appropriate.

Figure 6:
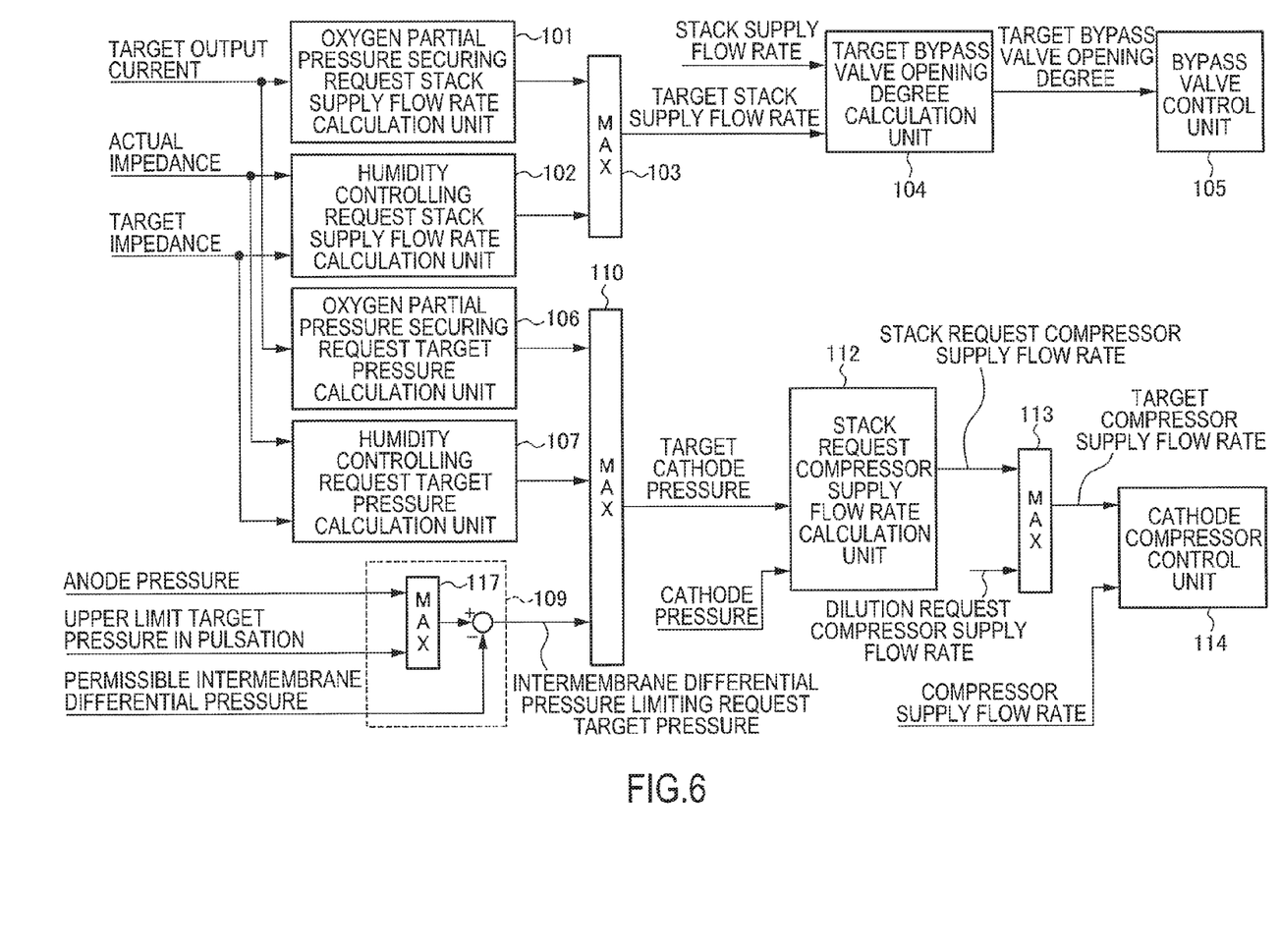
FIG. 6 is a block diagram explaining the cathode gas supply control according to a second embodiment of the present invention.

FIG. 6 is a block diagram explaining the cathode gas supply control according to this embodiment.

This embodiment is different from the first embodiment in that a selection unit 117 for selecting the higher pressure, out of the upper limit target pressure in pulsation and the anode pressure, is provided, and a pressure obtained by subtracting the permissible intermembrane differential pressure from the pressure outputted from the selection unit 117 is inputted, as the intermembrane differential pressure limiting request target pressure, to the target cathode pressure calculation unit 110.

Figure 7:
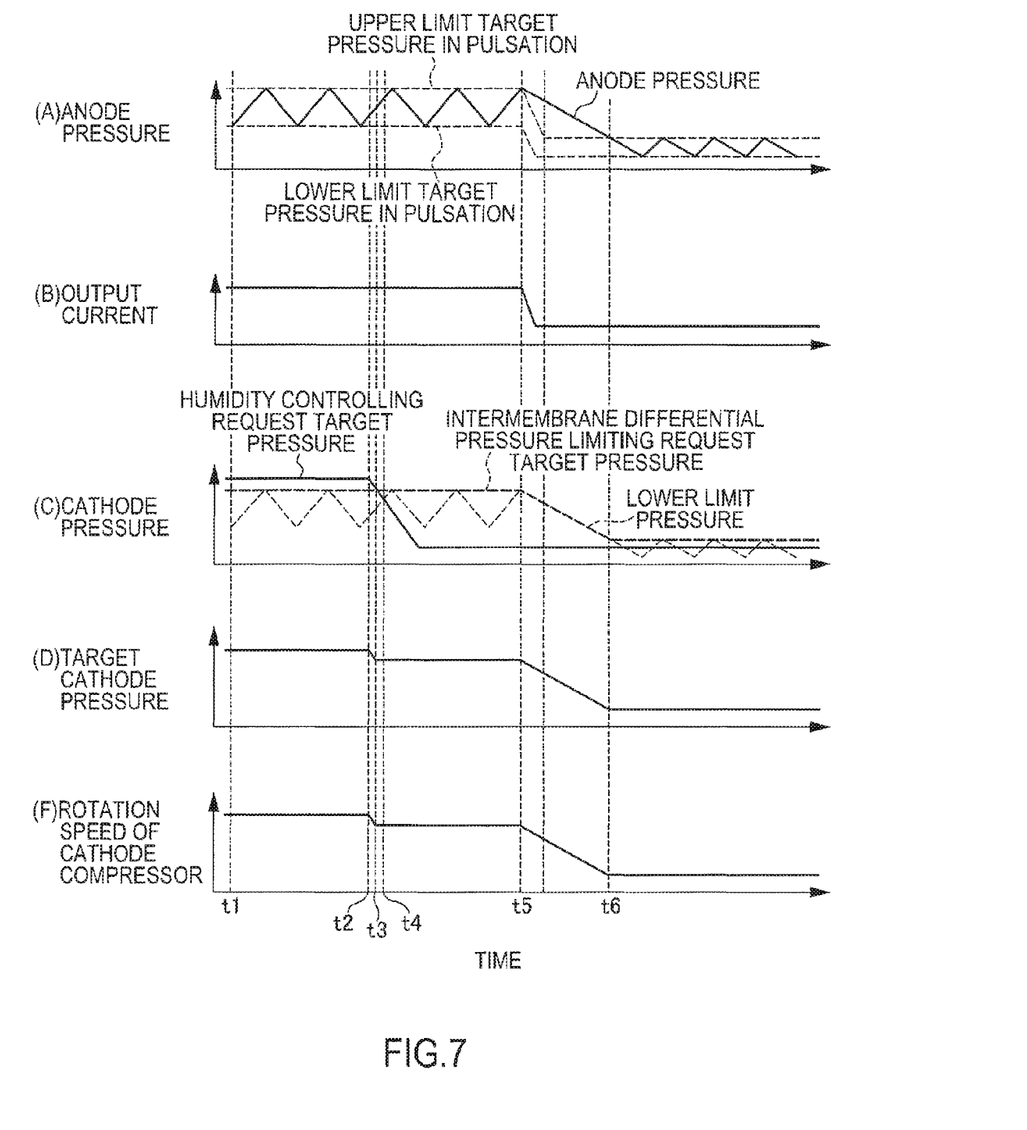
FIG. 7 is a time chart explaining operation of the anode gas supply control and the cathode gas supply control according to the second embodiment of the present invention.

FIG. 7 is a time chart explaining operation of the anode gas supply control and the cathode gas supply control according to this embodiment.

As a control block is structured as above according to this embodiment, the highest pressure, out of the oxygen partial pressure securing request pressure, the humidity controlling request target pressure, and the intermembrane differential pressure limiting request target pressure, is calculated as the target cathode pressure, and the cathode compressor 24 is controlled according to this target cathode pressure.

Therefore, as illustrated in FIG. 7, the intermembrane differential pressure limiting request target pressure, obtained by subtracting the permissible intermembrane differential pressure from the upper limit target pressure in pulsation, is set as the target cathode pressure, from time t3 to time t5 when the target output current decreases (FIG. 7(C), (D)). As the cathode compressor 24 is controlled according to the target cathode pressure that is kept at the constant value, it is possible to suppress the generation of the unusual sounds, such as the roar, from the cathode compressor 24 (FIG. 7(F)).

During the falling transient period from the time t5 to time t6, the intermembrane differential pressure limiting request target pressure, obtained by subtracting the permissible intermembrane differential pressure from the anode pressure, is set as the target cathode pressure (FIG. 7(C), (D)). This makes it possible to prevent the intermembrane differential pressure from exceeding the permissible intermembrane differential pressure during the falling transient period.

At and after the time t6, the intermembrane differential pressure limiting request target pressure, obtained by subtracting the permissible intermembrane differential pressure from the upper limit target pressure in pulsation, is set as the target cathode pressure again. As the cathode compressor 24 is controlled according to the target cathode pressure that is kept at the constant value again, it is possible to suppress the generation of the unusual sounds, such as the roar, from the cathode compressor 24 (FIG. 7(F)).

According to the embodiment as described thus far, the fuel cell system 100 is provided with the cathode compressor 24 for supplying the cathode gas to the fuel cell stack 1, the pulsating operation unit, the first target pressure setting unit, the second target pressure setting unit, and the controller 4 as the compressor control unit. The pulsating operation unit causes the pressure of the anode gas to pulsate based on the operation state of the fuel cell system 100. The first target pressure setting unit sets the first target pressure of the cathode gas (target cathode pressure) based on the requests of the fuel cell stack 1, such as the oxygen partial pressure securing request and the humidity controlling request. The second target pressure setting unit sets the second target pressure of the cathode gas (intermembrane differential pressure limiting request target pressure) for keeping the differential pressure inside the fuel cell stack 1 to be within the permissible differential pressure range according to the pressure of the anode gas in the fuel cell stack 1, based on the upper limit target pressure in pulsation that causes the pressure of the anode gas to pulsate. The compressor control unit controls the cathode compressor 24 based on the first target pressure and the second target pressure.

The second target pressure setting unit according to this embodiment sets the pressure, obtained by subtracting the permissible intermembrane differential pressure from the higher pressure out of the upper limit target pressure in pulsation and the anode pressure, as the intermembrane differential pressure limiting request target pressure, so that the intermembrane differential pressure limiting request target pressure does not pulsate together with the pulsation of the pressure of the anode gas.

Thereby, except for the falling transient period, the pressure obtained by subtracting the permissible intermembrane differential pressure from the upper limit target pressure in pulsation serves as the intermembrane differential pressure limiting request target pressure, and therefore, when the intermembrane differential pressure limiting request target pressure is set as the target cathode pressure, the cathode compressor 24 can be controlled according to the target cathode pressure that is kept at the constant value. This makes it possible to obtain the similar effects as those of the first embodiment, and to suppress the generation of the unusual sounds, such as the roar, from the cathode compressor 24.

The embodiments of the present invention have been explained thus far. However, the above-described embodiments are only a part of application examples of the present invention, and are not intended to limit the technical scope of the present invention to the concrete structures of the above-described embodiments.

Figure 8:
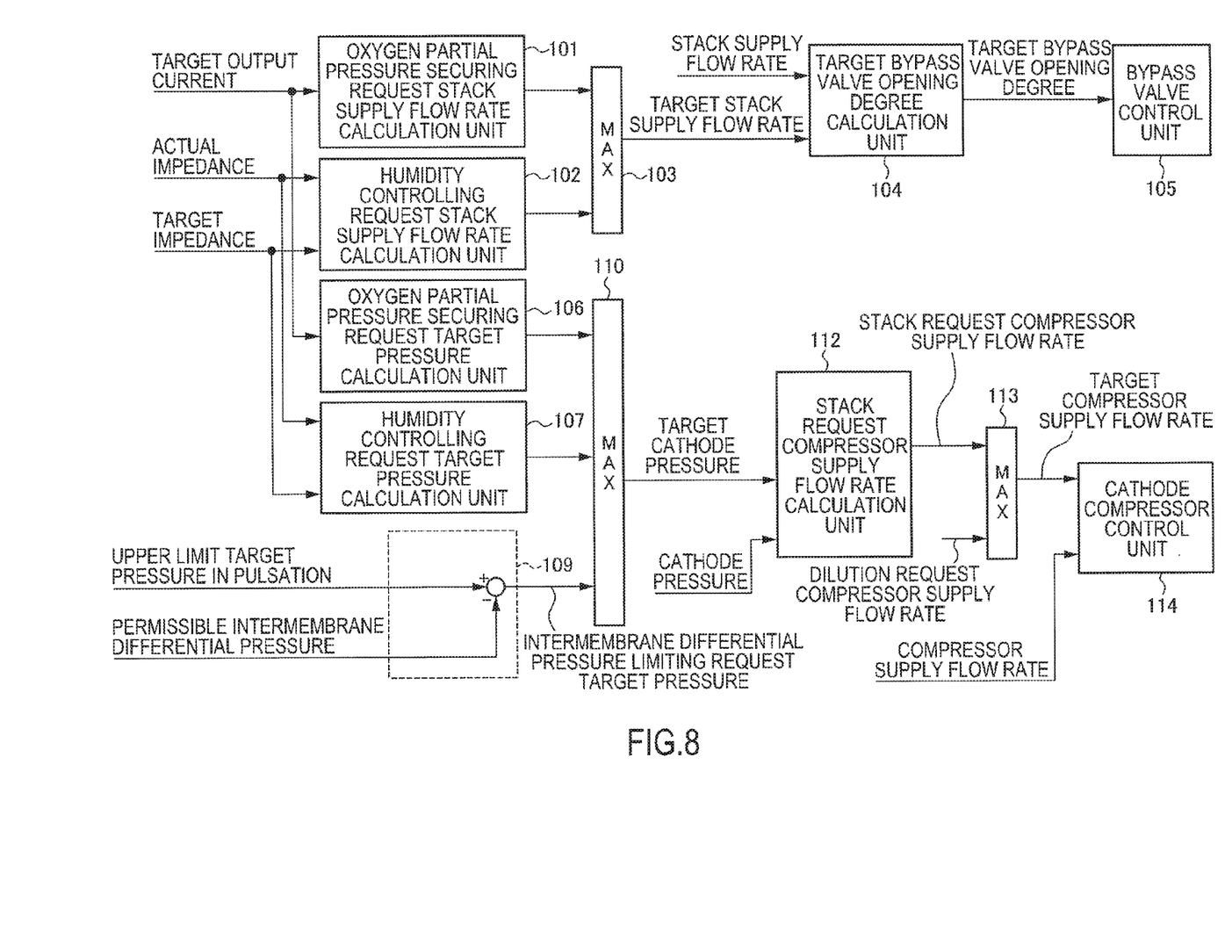
FIG. 8 is a block diagram explaining the cathode gas supply control according to another embodiment of the present invention.

According to the second embodiment, for example, the pressure, obtained by subtracting the permissible intermembrane differential pressure from the higher pressure out of the upper limit target pressure in pulsation and the anode pressure, is inputted to the target cathode pressure calculation unit 110 as the intermembrane differential pressure limiting request target pressure. Meanwhile, in the case where the upper limit target pressure in pulsation and the lower limit target pressure in pulsation are not changed according to the target output current and are allowed to have the predetermined fixed values, and the anode pressure is caused to pulsate, a control block of the cathode gas supply control, as illustrated in FIG. 8, may be formed.

Namely, in the case where the upper limit target pressure in pulsation and the lower limit target pressure in pulsation are allowed to have the predetermined fixed values, the upper limit target pressure in pulsation and the lower limit target pressure in pulsation do not change even when the target output current decreases, and therefore the upper limit target pressure in pulsation does not become lower than the anode pressure. Thus, as illustrated in FIG. 8, the intermembrane differential pressure limiting request target pressure calculation unit 109 may calculate the pressure, obtained by subtracting the permissible intermembrane differential pressure from the upper limit target pressure in pulsation, as the intermembrane differential pressure limiting request target pressure, and may input it to the target cathode pressure calculation unit 110.

Further, in the above-described embodiments, the upper limit target pressure in pulsation that is used In calculating the intermembrane differential pressure limiting request target pressure may include a value slightly lower than the upper limit target pressure in pulsation. This is also included in the technical scope of the present invention.

Furthermore, according to the above-described first embodiment, the limit target cathode pressure calculation unit 111 calculates, as the limit target cathode pressure, the higher pressure, out of the target cathode pressure and the intermembrane differential pressure limiting request target pressure. However, the target cathode pressure may be corrected by the intermembrane differential pressure limiting request target pressure. Similarly, according to the second embodiment, the oxygen partial pressure securing request pressure and the humidity controlling request target pressure may be corrected by the intermembrane differential pressure limiting request target pressure. Namely, the case where the first target pressure is corrected by the second target pressure is also included in the technical scope of the present invention.

The present application claims a priority of Japanese Patent Application No. 2013-145670 filed with the Japan Patent Office on Jul. 11, 2013, and all the contents of which are hereby incorporated by reference.

The invention claimed is:

1. A fuel cell system for generating power by supplying anode gas and cathode gas to a fuel cell, comprising:
 a compressor for supplying the cathode gas to the fuel cell; and
 a controller programmed to
  cause a pressure of the anode gas to pulsate between an upper limit target pressure in pulsation and a lower limit target pressure in pulsation set based on an operation state of the fuel cell system,
  set a first target pressure of the cathode gas based on a request of the fuel cell,
  seta second target pressure of the cathode gas for keeping a differential pressure in the fuel cell to be within a permissible differential pressure range according to the pressure of the anode gas in the fuel cell,
  control the compressor based on the first target pressure and the second target pressure, and
  set the second target pressure to a pressure obtained by subtracting the permissible differential pressure from the upper limit target pressure in pulsation.

2. The fuel cell system according to claim 1, wherein the controller is further programmed to control the compressor based on a higher pressure of the first target pressure and the second target pressure.

3. The fuel cell system according to claim 1, wherein the controller is further programmed to set the second target pressure to a pressure obtained by subtracting the permissible differential pressure from a higher pressure of the upper limit target pressure in pulsation and an actual pressure of the anode gas.

4. The fuel cell system according to claim 1, wherein the controller is further programmed to calculate an oxygen partial pressure securing request pressure based on a load of the fuel cell, the oxygen partial pressure securing request pressure being required for keeping an oxygen partial pressure in the fuel cell at a predetermined pressure or higher,
 calculate target humidity of an electrolyte membrane based on the load of the fuel cell,
 calculate a humidity controlling request pressure based on the target humidity, the humidity controlling request pressure being required for controlling humidity of the electrolyte membrane to be the target humidity,
 calculate a membrane protecting request pressure obtained by subtracting the permissible differential pressure from an actual pressure of the anode gas that is controlled based on the load of the fuel cell, and
 set the first target pressure based on the oxygen partial pressure securing request pressure, the humidity controlling request pressure, and the membrane protecting request pressure.

5. The fuel cell system according to claim 3, wherein the controller is further programmed to
 calculate an oxygen partial pressure securing request pressure based on a load of the fuel cell, the oxygen partial pressure securing request pressure being required for keeping an oxygen partial pressure in the fuel cell at a predetermined pressure or higher,
 calculate target humidity of an electrolyte membrane based on the load of the fuel cell,
 calculate a humidity controlling request pressure based on the target humidity, the humidity controlling request pressure being required for controlling humidity of the electrolyte membrane to be the target humidity, and
 set the first target pressure based on the oxygen partial pressure securing request pressure and the humidity controlling request pressure.

6. The fuel cell system according to claim 1, wherein the controller is further programmed to calculate the upper limit target pressure in pulsation and a lower limit target pressure in pulsation on the pulsation of the pressure of the anode gas based on the load of the fuel cell, and increase the upper limit target pressure in pulsation and the lower limit target pressure in pulsation with the load of the fuel cell being higher, as compared with a case of the lower load of the fuel cell.

7. A control method of a fuel cell system for generating power by supplying anode gas and cathode gas to a fuel cell, comprising:

a pulsating operation process causing a pressure of the anode gas to pulsate between an upper limit target pressure in pulsation and a lower limit target pressure in pulsation set based on an operation state of the fuel cell system;

a first target pressure setting process setting a first target pressure of the cathode gas based on a request of the fuel cell;

a second target pressure setting process setting a second target pressure of the cathode gas for keeping a differential pressure in the fuel cell to be within a permissible differential pressure range according to the pressure of the anode gas in the fuel cell; and a compressor controlling process controlling a compressor for supplying the cathode gas to the fuel cell, based on the first target pressure and the second target pressure, wherein the second target pressure setting process sets the second target pressure to a pressure obtained by subtracting the permissible differential pressure from the upper limit target pressure in pulsation.

8. A fuel cell system for generating power by supplying anode gas and cathode gas to a fuel cell, comprising:

a compressor for supplying the cathode gas to the fuel cell;

a pulsating operation unit causing a pressure of the anode gas to pulsate between an upper limit target pressure in pulsation and a lower limit target pressure in pulsation set based on an operation state of the fuel cell system;

a first target pressure setting unit setting a first target pressure of the cathode gas based on a request of the fuel cell;

a second target pressure setting unit setting a second target pressure of the cathode gas for keeping a differential pressure in the fuel cell to be within a permissible differential pressure range according to the pressure of the anode gas in the fuel cell; and a compressor control unit controlling the compressor based on the first target pressure and the second target pressure, wherein the second target pressure setting unit sets the second target pressure to a pressure obtained by subtracting the permissible differential pressure from the upper limit target pressure in pulsation, and wherein the first target pressure setting unit calculates an oxygen partial pressure securing request pressure based on a load of the fuel cell, the oxygen partial pressure securing request pressure being required for keeping an oxygen partial pressure in the fuel cell at a predetermined pressure or higher, calculates target humidity of an electrolyte membrane based on the load of the fuel cell, calculates a humidity controlling request pressure based on the target humidity, the humidity controlling request pressure being required for controlling humidity of the electrolyte membrane to be the target humidity, calculates a membrane protecting request pressure obtained by subtracting the permissible differential pressure from an actual pressure of the anode gas that is controlled based on the load of the fuel cell, and sets the first target pressure based on the oxygen partial pressure securing request pressure, the humidity controlling request pressure, and the membrane protecting request pressure.

\* \* \* \* \*